United States Patent [19]

Barcza

[11] 3,764,597

[45] Oct. 9, 1973

[54] 2-TRIALKYLSILYLALKYL-5,6-DIHYDRO-1,3(4H)-OXAZINES

[75] Inventor: Sandor Barcza, West Orange, N.J.

[73] Assignee: Sandoz-Wander, Inc., Hanover, N.J.

[22] Filed: Mar. 10, 1972

[21] Appl. No.: 233,816

[52] U.S. Cl. ............................. 260/244 R, 424/248
[51] Int. Cl. ............................................. C07d 87/14
[58] Field of Search ....................................... 260/244

[56] References Cited
UNITED STATES PATENTS
3,531,425   9/1970   Burk et al. .......................... 260/244

Primary Examiner—Harry I. Moatz
Attorney—Gerald D. Sharkin et al.

[57] ABSTRACT 4,4,5-Trialkyl-2-trialkylsilylalkyl-5,6-dihydro-1,3(4H)-oxazines, e.g. 4,4,6-trimethyl-2-trimethylsilylmethyl-5,6-dihydro-1,3(4H)oxazine are prepared by reacting the lithio salt of a 2,4,4,6-tetraalkyl-5,6-dihydro-1,3(4H)-oxazine with a halotrialkylsilane and are useful by reason of their pharmacological activity in animals, e.g. in the treatment of peptic ulcers.

7 Claims, No Drawings

2-TRIALKYLSILYLALKYL-5,6-DIHYDRO-1,3(4H)-OXAZINES

This application relates to novel silane derivatives which are useful in the treatment of peptic ulcers. In particular, it relates to 4,4,6-trialkyl-2-trialkylsilylalkyl-5,6-dihydro-1,3(4H)-oxazines and to processes for their preparation.

The compounds of this invention may be represented by the following formula:

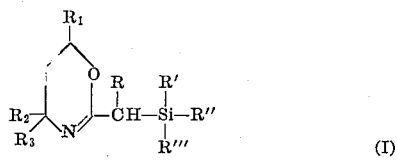

where
$R_1$, $R_2$ and $R_3$ each independently represent alkyl having one to four carbon atoms, e.g. methyl, ethyl and isopropyl;
$R'$, $R''$ and $R'''$ each independently represent alkyl having one to four carbon atoms;
R is hydrogen or alkyl of one to four carbon atoms.

The compounds of formula (I) may be prepared by reacting a compound of formula (II)

where
$R'$, $R''$ and $R'''$ are as defined above and
X is chloro, bromo or iodo, with a salt of formula (III)

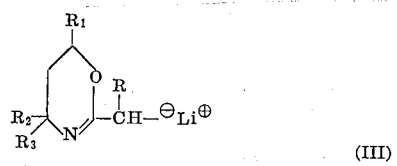

where
$R_1$, $R_2$, $R_3$ and R are as defined above.

The reaction between the compounds of formulae (II) and (III) is carried out at reduced temperature in an inert solvent and atmosphere. It is preferred that the reaction be carried out in an aprotic solvent such as aliphatic or aromatic hydrocarbons, for example, hexane or toluene, and especially in polar aprotic solvents, e.g., diethyl ether, dioxane with a co-solvent to lower the melting point or tetrahydrofuran. The preferred inert gases are nitrogen, argon or helium. The temperature of the reaction should be maintained below −30°C., preferably below −50°C. The product (I) is recovered by conventional techniques, e.g., extraction and distillation. The time of the reaction is not critical but for optimum results the reaction should be run for about 2 to 12 hours.

Those compounds of formula (II) wherein X is bromine or iodine are more desirable from the standpoint of being more reactive. However, the chlorides are quite satisfactory in their reactivity and have the advantage of being more readily available. Many of the compounds of formula (II) are known and may be prepared by methods known in the art using known starting materials.

The compounds of formula (III) are known or may be prepared by methods described in the literature. For example, they may be prepared by reacting a tetraalkyl oxazine such as 2,4,4,4-tetramethyl-5,6-dihydro-1,3(4H)-oxazine with a suitable base such as phenyl-, n-butyl- or t-butyllithium in an inert solvent at a temperature below −50°C. in accordance with the teaching of A. I. Meyers et al., J. Am. Chem. Soc. 91 763 (1969).

The compounds of formula (I) are useful because they possess pharmacological activity in animals. In particular, the compounds I are useful in the treatment of peptic ulcers as indicated, for example, by antagonism of vagal stimulation in anesthetized dogs given the compound (5–200 mg./kg. i v.) and by histological examination of the stomach and by ascertaining the stomach contents of male rats given the compound (5–200 mg./kg. p.o.), after pyloric ligation in accordance with the method of H. Shay et al., Gastroenterology 5:43–61 (1945). For such use, the compounds may be combined with a pharmaceutically acceptable carrier, and such other conventional adjuvants as may be necessary, and administered orally in such forms as tablets, capsules and the like or parenterally in the form of an injectable solution or suspension. The dosage administered will, of course, vary depending upon the compounds used and the mode of administration. However, in general, satisfactory results are obtained when administered at a daily dosage of from about 0.5 milligrams to about 200 milligrams per kilogram of body weight, preferably in divided doses two to four times a day or in sustained release form. For most large mammals the administration of from about 35 milligrams to about 1000 milligrams of the compound per day provides satisfactory results and dosage forms suitable for internal administration comprise from about 9 milligrams to about 500 milligrams of the compound in admixture with a solid or liquid pharmaceutical carrier or diluent.

For the above usage, oral administration with carriers may take place in such conventional forms as tablets, dispersible powders, granules and capsules, capsules being preferred when the compound of formula (I) is a liquid. Such compositions may be prepared according to methods known in the art for manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium phosphate, terra alba, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastro-intestinal tract and thereby provide a sustained action over a longer period. Similarly, emulsions may contain the active ingredient in admixture with conventional excipients utilized for the preparation of such compositions. Capsules preferably contain the active ingredient admixed with a vegatable oil, e.g. peanut oil or sesame oil.

The compounds of formula (I) are best stored under anhydrous conditions.

A representative formulation of a capsule prepared by conventional techniques is as follows:

| Ingredient | Weight (mg.) Capsule |
|---|---|
| 4,4,6-Trimethyl-2-trimethylsilylmethyl-5,6-dihydro-1,3(4H) oxazine | 70 |
| Peanut oil | 180 |

The following example illustrates the invention:

EXAMPLE 1

4,4,6-Trimethyl-2-trimethylsilylmethyl-5,6-dihydro-1,3(4H)-oxazine

Under nitrogen, 300 ml. of absolute tetrahydrofuran and 42.3 g. of 2,4,4,6-tetramethyl-5,6-dihydro-1,3(4H)-oxazine are cooled to −70°C. Dropwise, 187.5 ml. of 1.6 M n-butyl lithium solution in n-hexane is added and the solution is stirred for 30 minutes at −50°C. after the addition is complete. To the resulting yellow suspension 32.6 g. of chlorotrimethylsilane is added dropwise, keeping the temperature below −50°C. The mixture is further stirred at −50°C. for 3 hours. This cold mixture is poured onto a combination of 1 liter benzene and ice. The phases are separated and the organic phase is washed with two more portions of cold water, dried with magnesium sulfate and concentrated to a yellow oil. This oil is distilled at 0.1 mm.Hg and approximately 40°C. into a receiver cooled by a dry ice bath. The two main fractions totalling 32 g. are recombined and refractionated at 0.1 mm.Hg with the product being collected at from 40° to 45°C.

What is claimed is:

1. A compound of the formula

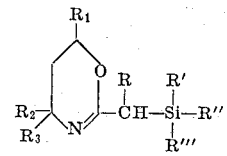

where
$R_1$, $R_2$, $R_3$, $R'$, $R''$ and $R'''$ each independently represent alkyl having one to four carbon atoms, and
R is hydrogen or alkyl of one to four carbon atoms.

2. A compound of claim 1 wherein $R_1$, $R_2$ and $R_3$ are methyl.

3. A compound of claim 1 wherein $R'$, $R''$ and $R'''$ are methyl.

4. The compound of claim 2 wherein $R'$, $R''$ and $R'''$ are methyl.

5. A compound of claim 1 wherein R is hydrogen.

6. A compound of claim 2 wherein R is hydrogen.

7. The compound of claim 4 wherein R is hydrogen.

* * * * *